(12) United States Patent
Raghu et al.

(10) Patent No.: US 12,379,906 B2
(45) Date of Patent: Aug. 5, 2025

(54) METHOD AND SYSTEM FOR CREATING APPLICATION USER INTERFACE WITHIN INTEGRATED DEVELOPMENT ENVIRONMENT

(71) Applicant: Mindtree Limited, Bangalore (IN)

(72) Inventors: Jishnu Raghu, Bengaluru (IN); Hareesh, Bengaluru (IN)

(73) Assignee: Mindtree Limited, Bangalore (IN)

( * ) Notice: Subject to any disclaimer, the term of this patent is extended or adjusted under 35 U.S.C. 154(b) by 53 days.

(21) Appl. No.: 18/226,790

(22) Filed: Jul. 27, 2023

(65) Prior Publication Data

US 2024/0061658 A1   Feb. 22, 2024

(30) Foreign Application Priority Data

Aug. 17, 2022 (IN) .............................. 202241046857

(51) Int. Cl.
*G06F 8/38* (2018.01)
*G06F 8/10* (2018.01)

(52) U.S. Cl.
CPC . *G06F 8/38* (2013.01); *G06F 8/10* (2013.01)

(58) Field of Classification Search
CPC .................................... G06F 8/38; G06F 8/10
USPC ................................................. 717/107–140
See application file for complete search history.

(56) References Cited

U.S. PATENT DOCUMENTS

| | | | |
|---|---|---|---|
| 7,404,177 B1 * | 7/2008 | Greenfield | G06F 8/70 |
| | | | 717/106 |
| 8,381,180 B2 | 2/2013 | Rostoker | |
| 8,413,062 B1 * | 4/2013 | Little | G06F 8/38 |
| | | | 715/764 |
| 8,429,203 B2 | 4/2013 | Perez et al. | |
| 8,438,495 B1 * | 5/2013 | Gilra | G06F 3/0481 |
| | | | 345/173 |
| 8,943,468 B2 * | 1/2015 | Balasubramanian | G06F 8/38 |
| | | | 717/109 |
| 9,372,683 B2 * | 6/2016 | Szocs | G06F 8/38 |

(Continued)

FOREIGN PATENT DOCUMENTS

WO    2008147616 A1    12/2008

OTHER PUBLICATIONS

Ramon et al., "The Guizmo Framework for Generating Final User Interfaces from Wireframes", ACM, pp. 82-84 (Year: 2023).*

(Continued)

*Primary Examiner* — Anil Khatri
(74) *Attorney, Agent, or Firm* — Kendal M. Sheets

(57) ABSTRACT

A method and system of creating an application User Interface (UI) within an Integrated Development Environment (IDE) is disclosed. The system processes wireframes that outline the intended UI structure, identifies relevant functional components, and associates them with predefined elements in a functional repository. A coordinate-based tracing mechanism ensures precise placement of UI elements, facilitating seamless mapping to standard UI functionalities. The system subsequently generates corresponding UI code tailored to various frameworks, such as Angular, React, or Flutter. This approach enhances development efficiency by leveraging reusable UI components while accommodating customization needs, reducing manual effort, and maintaining consistency across applications.

12 Claims, 10 Drawing Sheets

(56) References Cited

U.S. PATENT DOCUMENTS

| | | | | |
|---|---|---|---|---|
| 10,296,308 B2* | 5/2019 | Lance | ............... | G06F 8/30 |
| 10,331,423 B1 | 6/2019 | Parsolano | | |
| 10,489,126 B2* | 11/2019 | Kumar | ............... | G06V 30/422 |
| 10,635,413 B1* | 4/2020 | Krishnamoorthy | ....... | G06T 7/11 |
| 10,854,180 B2* | 12/2020 | Silverstein | ........... | G10H 1/0025 |
| 11,080,025 B2* | 8/2021 | Williamson | ........... | G06N 3/045 |
| 11,221,833 B1* | 1/2022 | Huang | ................. | G06F 9/451 |
| 12,147,646 B2* | 11/2024 | Jacobson | .............. | G06F 3/0483 |
| 2012/0060141 A1* | 3/2012 | Demant | ................ | G06Q 10/06 717/101 |
| 2019/0095225 A1 | 3/2019 | Nandagopal | | |

OTHER PUBLICATIONS

Gajjar et al., "Akin: Generating UI Wireframes From UI Design Patterns Using Deep Learning", ACM, pp. 40-42 (Year: 2021).*

Chen et al, "Wireframe-based UI Design Search through Image Autoencoder", ACM, 1-31 (Year: 2020).*

Huang et al, "Leveraging the Crowd for Creating Wireframe-based Exploration of Mobile Design Pattern Gallery", ACM, pp. 1-3 (Year: 2013).*

Kolthoff et al, "GUI2WiRe: Rapid Wireframing with a Mined and Large-Scale GUI Repository using Natural Language Requirements", ACM, pp. 1-5 (Year: 2020).*

* cited by examiner

METHOD AND SYSTEM FOR CREATING APPLICATION USER INTERFACE WITHIN INTEGRATED DEVELOPMENT ENVIRONMENT

TECHNICAL FIELD

This disclosure relates generally to application User Interface (UI), and more particularly to a method and a system for creating application UI within an Integrated Development Environment (IDE).

BACKGROUND

Mostly project teams implement application user interface (UI) from scratch even though a similar implementation exists. When requirements for similar applications across various customer/company are compared, there may be a lot of common functionalities between them. Even though the functionalities are similar, there may be a difference in the UI due to a difference in branding style of a customer/company or feature changes. In an application, a wireframe provides information about representation of the application UI. For a full-fledged application, there may be multiple wireframes defining various looks and feel of the application.

Currently, various users make use of "what you see is what you get" (WYSIWYG) tools to construct their websites and applications. Some of the tools such as Windows Installer XML (WIX) and content management systems provide ability to customize the component template as applicable. However, this is cumbersome for a user, as it requires a lot of human effort and time based on complexity of the UI.

As such, there is a need for a system and a method for creating an application UI within an Integrated Development Environment (IDE) that reduces the effort required for developing the application UI from the scratch making use of the existing known semantics of Application UI requirements in addition to preserving the different look and feel with the help of wireframes provided.

SUMMARY

In one embodiment, a method creating an application User Interface (UI) within an Integrated Development Environment (IDE) is disclosed. The disclosed method simplifies UI development by automating the translation of wireframes into functional UI code. Upon receiving a wireframe, the method extracts and analyzes wireframe's components, linking them with predefined functionalities stored in a structured repository. A coordinate-based mechanism enables precise mapping of these components, preserving the intended layout and ensuring consistency in UI representation. The method supports various frameworks, including Angular, React, and Flutter, dynamically generating the necessary code while allowing customization to meet specific branding and user experience requirements. This approach significantly reduces development time, eliminates redundant efforts, and enhances UI uniformity across multiple applications. By automating UI creation, the disclosed method provides developers with a streamlined workflow, minimizing manual coding while ensuring the adaptability of designs across different platforms and use cases.

In another embodiment, a system for creating an application User Interface (UI) within an Integrated Development Environment (IDE) is disclosed. The system may include a processor, and a memory communicatively coupled to the processor. The memory stores processor instructions, which when executed by the processor, cause the processor to execute a series of step for creating an application User Interface (UI). The disclosed system simplifies UI development by automating the translation of wireframes into functional UI code. Upon receiving a wireframe, the system extracts and analyzes wireframe's components, linking them with predefined functionalities stored in a structured repository. A coordinate-based mechanism enables precise mapping of these components, preserving the intended layout and ensuring consistency in UI representation. The system supports various frameworks, including Angular, React, and Flutter, dynamically generating the necessary code while allowing customization to meet specific branding and user experience requirements. This approach significantly reduces development time, eliminates redundant efforts, and enhances UI uniformity across multiple applications. By automating UI creation, the disclosed system provides developers with a streamlined workflow, minimizing manual coding while ensuring the adaptability of designs across different platforms and using cases.

In yet another embodiment, a non-transitory computer-readable storage medium is disclosed. The non-transitory computer-readable storage medium has computer-executable instructions stored thereon of creating an application UI within an IDE. The computer-executable instructions may cause a computer comprising one or more processors to perform operations. The disclosed operation comprises simplifying UI development by automating the translation of wireframes into functional UI code. Upon receiving a wireframe, the wireframe is extracted, and components of wireframe are analyzed, linking them with predefined functionalities stored in a structured repository. A coordinate-based mechanism enables precise mapping of these components, preserving the intended layout and ensuring consistency in UI representation. The operation may support various frameworks, including Angular, React, and Flutter, dynamically generating the necessary code while allowing customization to meet specific branding and user experience requirements. This approach significantly reduces development time, eliminates redundant efforts, and enhances UI uniformity across multiple applications. By automating UI creation, the disclosed operation provides developers with a streamlined workflow, minimizing manual coding while ensuring the adaptability of designs across different platforms and using cases.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
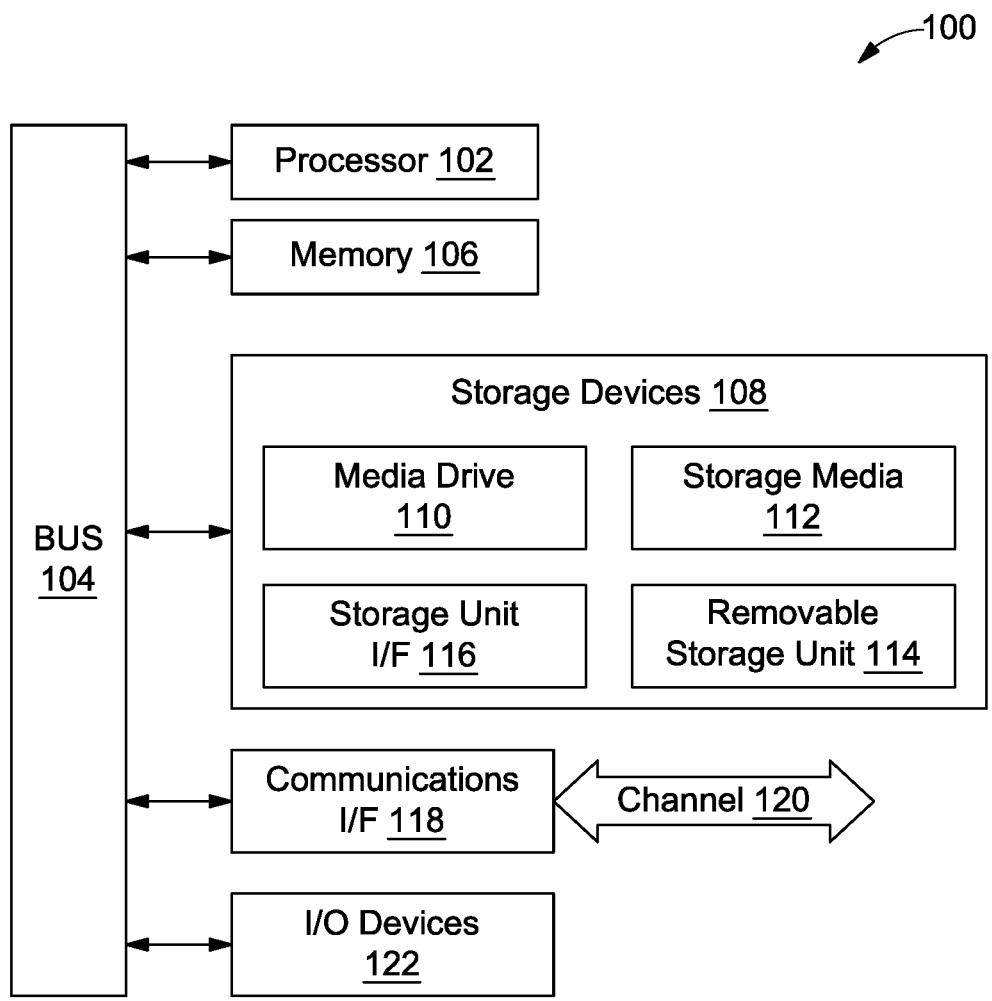
FIG. 1 is a block diagram of a computing system that may be employed to implement processing functionality for various embodiments.

Referring now to FIG. 1, an exemplary computing system 100 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 100 may represent, for example, a user device such as a desktop, a laptop, a mobile phone, personal entertainment device, DVR, and so on, or any other type of special or general-purpose computing device as may be desirable or appropriate for a given application or environment. The computing system 100 may include one or more processors, such as a processor 102 that may be implemented using a general or special purpose processing engine such as, for example, a microprocessor, microcontroller or other control logic. In this example, the processor 102 is connected to a bus 104 or other communication medium.

The computing system 100 may also include a memory 106 (main memory), for example, Random Access Memory (RAM) or other dynamic memory, for storing information and instructions to be executed by the processor 102. The memory 106 also may be used for storing temporary variables or other intermediate information during execution of instructions to be executed by the processor 102. The computing system 100 may likewise include a read only memory ("ROM") or other static storage device coupled to bus 104 for storing static information and instructions for the processor 102.

The computing system 100 may also include storage devices 108, which may include, for example, a media drive 110 and a removable storage interface. The media drive 110 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 112 may include, for example, a hard disk, magnetic tape, flash drive, or other fixed or removable medium that is read by and written to by the media drive 110. As these examples illustrate, the storage media 112 may include a computer-readable storage medium having stored therein particular computer software or data.

In alternative embodiments, the storage devices 108 may include other similar instrumentalities for allowing computer programs or other instructions or data to be loaded into the computing system 100. Such instrumentalities may include, for example, a removable storage unit 114 and a storage unit interface 116, such as a program cartridge and cartridge interface, a removable memory (for example, a flash memory or other removable memory module) and memory slot, and other removable storage units and interfaces that allow software and data to be transferred from the removable storage unit 114 to the computing system 100.

The computing system 100 may also include a communications interface 118. The communications interface 118 may be used to allow software and data to be transferred between the computing system 100 and external devices. Examples of the communications interface 118 may include a network interface (such as an Ethernet or other NIC card), a communications port (such as for example, a USB port, a micro USB port), Near field Communication (NFC), etc. Software and data transferred via the communications interface 118 are in the form of signals which may be electronic, electromagnetic, optical, or other signals capable of being received by the communications interface 118. These signals are provided to the communications interface 118 via a channel 120. The channel 120 may carry signals and may be implemented using a wireless medium, wire or cable, fiber optics, or other communications medium. Some examples of the channel 120 may include a phone line, a cellular phone link, an RF link, a Bluetooth link, a network interface, a local or wide area network, and other communications channels.

The computing system 100 may further include Input/Output (I/O) devices 122. Examples may include, but are not limited to a display, keypad, microphone, audio speakers, vibrating motor, LED lights, etc. The I/O devices 122 may receive input from a user and also display an output of the computation performed by the processor 102. In this document, the terms "computer program product" and "computer-readable medium" may be used generally to refer to media such as, for example, the memory 106, the storage devices 108, the removable storage unit 114, or signal(s) on the channel 120. These and other forms of computer-readable media may be involved in providing one or more sequences of one or more instructions to the processor 102 for execution. Such instructions, generally referred to as "computer program code" (which may be grouped in the form of computer programs or other groupings), when executed, enable the computing system 100 to perform features or functions of embodiments of the present invention.

In an embodiment where the elements are implemented using software, the software may be stored in a computer-readable medium and loaded into the computing system 100 using, for example, the removable storage unit 114, the media drive 110 or the communications interface 118. The control logic (in this example, software instructions or computer program code), when executed by the processor 102, causes the processor 102 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Figure 2:
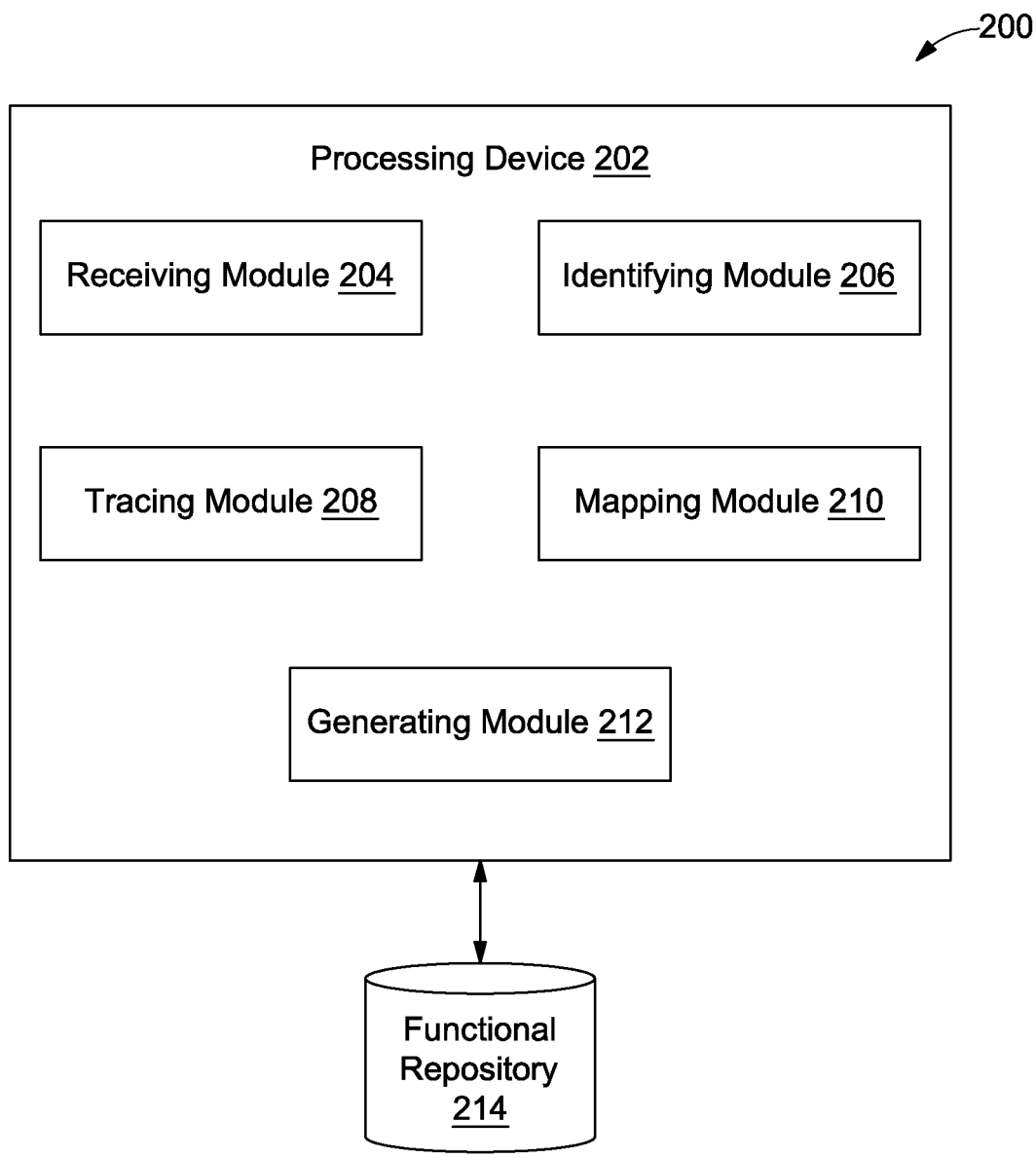
FIG. 2 is a block diagram of a processing device for creating an application User Interface (UI) within an Integrated Development Environment (IDE), in accordance with some embodiments of the present disclosure.

Referring now to FIG. 2, a block diagram of a processing device 202 for creating an application UI within an Integrated Development Environment (IDE), is illustrated, in accordance with an embodiment. The processing device 202 may include a receiving module 204, an identification module 206, a tracing module 208, a mapping module 210, and a code generating module 212. The processing device 202 may be communicatively coupled to a functional repository 214. In some embodiments, a hierarchal semantic tree of a plurality of semantics may be created corresponding to functional components of various wireframes. Further, the plurality of semantics may be stored in the functional repository 214.

The receiving module 204 may be configured to receive a wireframe in the IDE. The wireframe may include a plurality of functional components for a current requirement of creating the application UI. In some embodiments, the processing device 202 may receive the requirement to create the application UI. The requirement may be for example, selection of one or more functional components from the plurality of functional components that may be required for the wireframe. The processing device 202 may further extract the wireframe based on the requirement in the IDE.

The identification module 206 may identify a functionality corresponding to the wireframe from a plurality of functionalities within the functional repository 214. The functionality may include a plurality of predefined sub-functions. The plurality of pre-defined sub-functions may include semantics corresponding to the plurality of functional components. The tracing module 208 may trace, through a co-ordinate system, the plurality of functional components of the wireframe to identify locations of the plurality of functional components in the wireframe.

The mapping module 210 may map the plurality of functional components to the plurality of predefined sub-functions of the functionality. Additionally, the mapping module 210 along with the tracing module 208 ensures the semantics corresponding to the plurality of functional components from the functional repository is preserved and a new look from the wireframe may be ensured. This may help to have a functionally different UI using the same known semantics. Based on mapping, the code generation module 212 may automatically generate a code for creating the application UI. The created application UI may be a web application UI, or a mobile application UI (depending on customer needs). In some embodiments the application UI may be created using at least one of a plurality of frameworks that may include an Angular framework, a React framework, a Flutter framework, and an Xamarin framework. In some embodiments, one or more branding styles may be generated based on the identified locations of the plurality of functional components in the wireframe.

It should be noted that all such aforementioned modules 202-212 may be represented as a single module or a combination of different modules. Further, as will be appreciated by those skilled in the art, each of the modules 202-212 may reside, in whole or in parts, on one device or multiple devices in communication with each other. In some embodiments, each of the modules 202-212 may be implemented as dedicated hardware circuit comprising custom application-specific integrated circuit (ASIC) or gate arrays, off-the-shelf semiconductors such as logic chips, transistors, or other discrete components. Each of the modules 202-212 may also be implemented in a programmable hardware device such as a field programmable gate array (FPGA), programmable array logic, programmable logic device, and so forth. Alternatively, each of the modules 202-212 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

Figure 3:
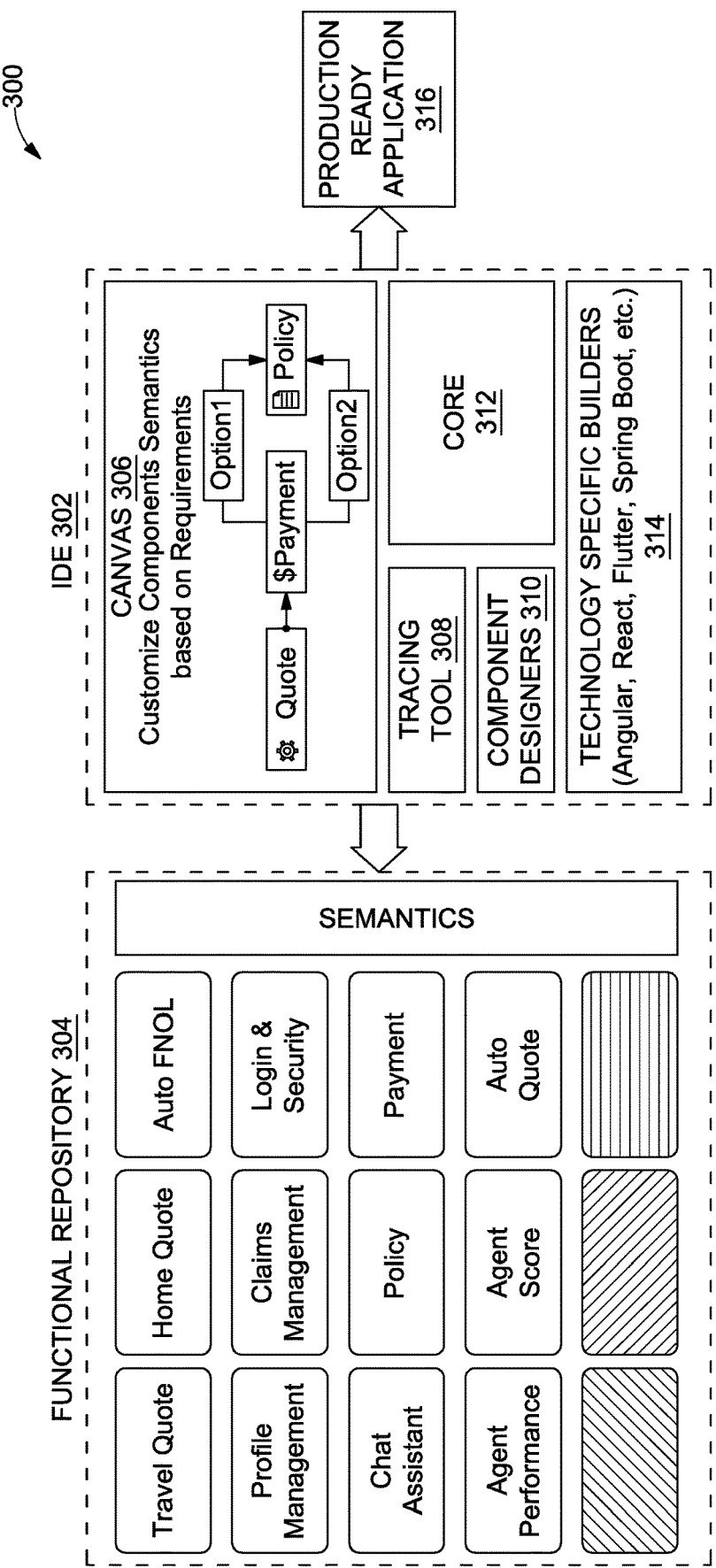
FIG. 3 illustrates a functional block diagram for creating an application UI within an IDE, in accordance with an embodiment.

Referring now to FIG. 3, a functional block diagram 300 of creating an application UI within an IDE is illustrated, in accordance with an embodiment. The block diagram 300 may include an IDE 302 and a functional repository 304. The IDE 302 may include a canvas 306, a tracing tool 308, component designers 310, a core 312, and technology specific builders 314. The functional repository 304 may include a plurality of functionalities. The plurality of functionalities may be, for example, but are not limited to, a login and security functionality, a travel quote functionality, a home quote functionality, an auto First Notice of Loss (FNOL) functionality, a profile management functionality, a claims management functionality, a chat assistant functionality, a policy functionality, a payment functionality, an agent performance functionality, an agent score functionality, an auto quote functionality, and the like. The core 312 may include a set of software components used for the working of the canvas 306, the tracing tool 308, the component designers 310 and the technology specific builders 314. It may be software libraries used across multiple components.

In order to create the application UI, a wireframe may be loaded into the IDE 302. The wireframe may include a plurality of functional components along with a predefined application requirement based on which the application UI is to be created. Once the wireframe is loaded into the IDE 302, a functionality corresponding to the wireframe may be identified from the plurality of functionalities within the functional repository 304. The identified functionality may be customized as per an application requirement in the canvas 304 of the IDE 302. The functionality may further include a plurality of predefined sub-functions.

The tracing tool 308 may be configured to trace the plurality of functional components of the wireframe to identify locations of each of the plurality of functional components in the wireframe. In some embodiments, based on the identified locations of the plurality of functional components, the component designers 310 may be configured to automatically generate one or more branding styles for a customer based on the functionality identified corresponding to the wireframe.

Once the location of each of the plurality of functional components is identified, the plurality of functional components may be mapped to the plurality of predefined sub-functions of the identified functionality. In some embodiments, the plurality of functional components may be mapped to semantics of the plurality of predefined sub-functions prestored in the functional repository 304.

Based on mapping, the technology specific builders 314 may generate a code for creating the application UI. It may be noted that the generated code may be created using at least one of a plurality of frameworks including, but not limited to, an Angular framework, React framework, Flutter framework. It may depend on a reference implementation as well as the capability of the builders to generate the code in that technology. The created application UI may be a production ready application 316 which may be functional and responsive with customer branding, features like i18n, analytics, login, and security flow may be included, and additional technology support may be added.

Figure 4:
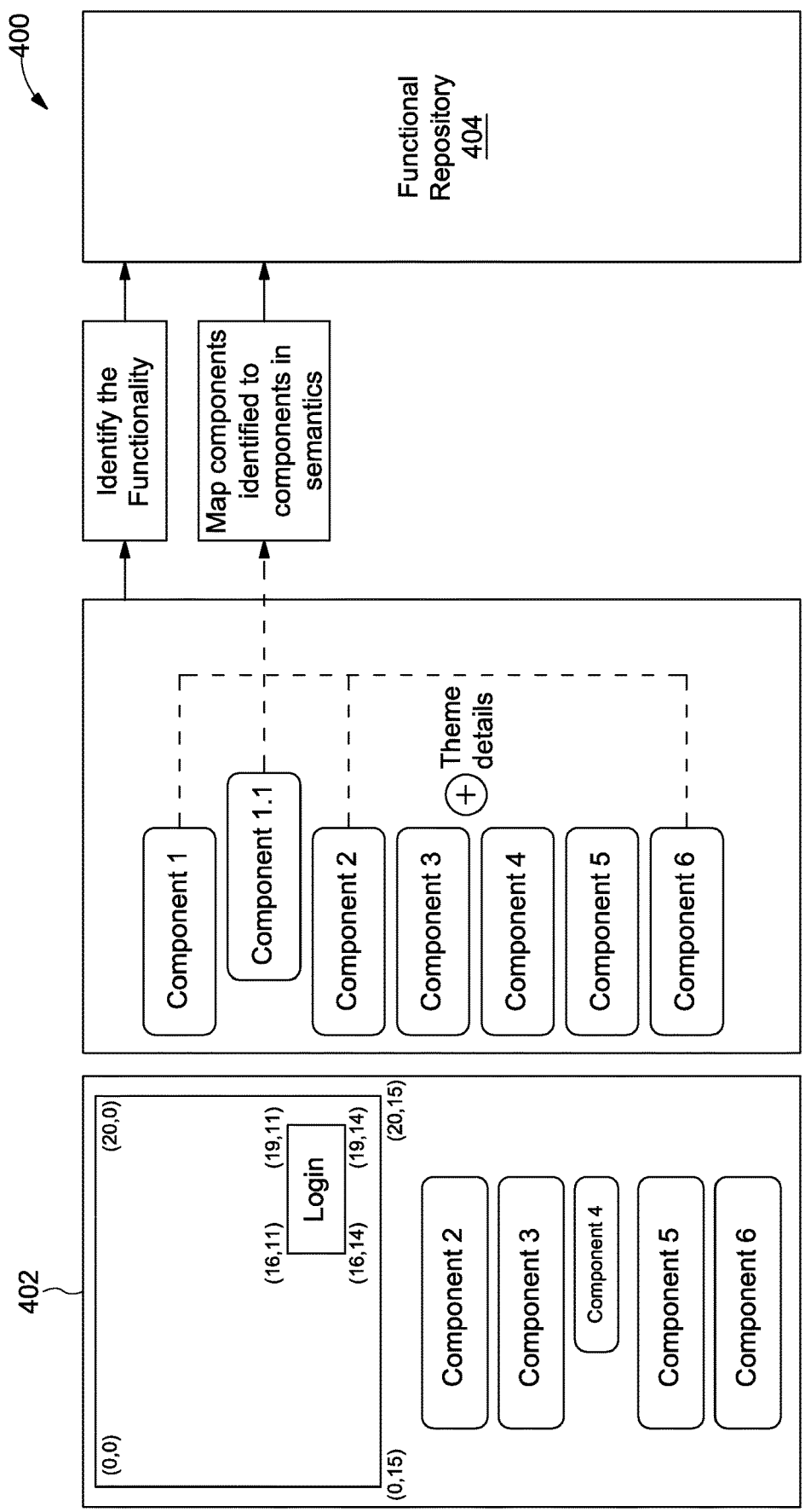
FIG. 4 illustrates a block diagram for creating an application UI within an IDE, in accordance with an embodiment.

Referring now to FIG. 4, an exemplary block diagram 400 for creating an application UI within an IDE is illustrated, in accordance with an embodiment. The block diagram 400 may include a wireframe 402 and a functional repository 404. The wireframe 402 may include a plurality of functional components for example, component 1.1, component 2, component 3, component 4, component 5 and component 6. The wireframe 402 may include the plurality of functional components for a current requirement of creating the application UI. The requirement for creating the application UI may be predefined in the wireframe 402.

As mentioned above, once the wireframe 402 along with the current application requirement is received in the IDE, a functionality corresponding to the wireframe 402 may be identified from a plurality of functionalities within the functional repository 404. The functionality may include a plurality of predefined sub-functions. In an embodiment, the identified functionality may include similar set of functional components as present in the wireframe 402. Further, the plurality of functional components of the wireframe 402 may be traced to identify locations of each of the plurality of functional components in the wireframe 402.

Once the plurality of functional components is traced, the plurality of functional components may be mapped to the plurality of predefined sub-functions of the functionality. For example, as shown in FIG. 4, the "component 1.1" of the wireframe 402 may be mapped to the predefined sub-function "component 1.1" of the identified functionality that may be prestored in the functional repository 404. Similarly, the "component 2" in the wireframe 402 may be mapped to the predefined sub-function "component 2" of the identified functionality, the "component 3" in the wireframe 402 may be mapped to the predefined sub-function "component 3" of the identified functionality, the "component 4" in the wireframe 402 may be mapped to the predefined sub-function "component 4" of the identified functionality, the "component 5" in the wireframe 402 may be mapped to the predefined sub-function "component 5" of the identified functionality, and the "component 6" in the wireframe 402 may be mapped to the predefined sub-function "component 6" of the identified functionality.

Figure 5:
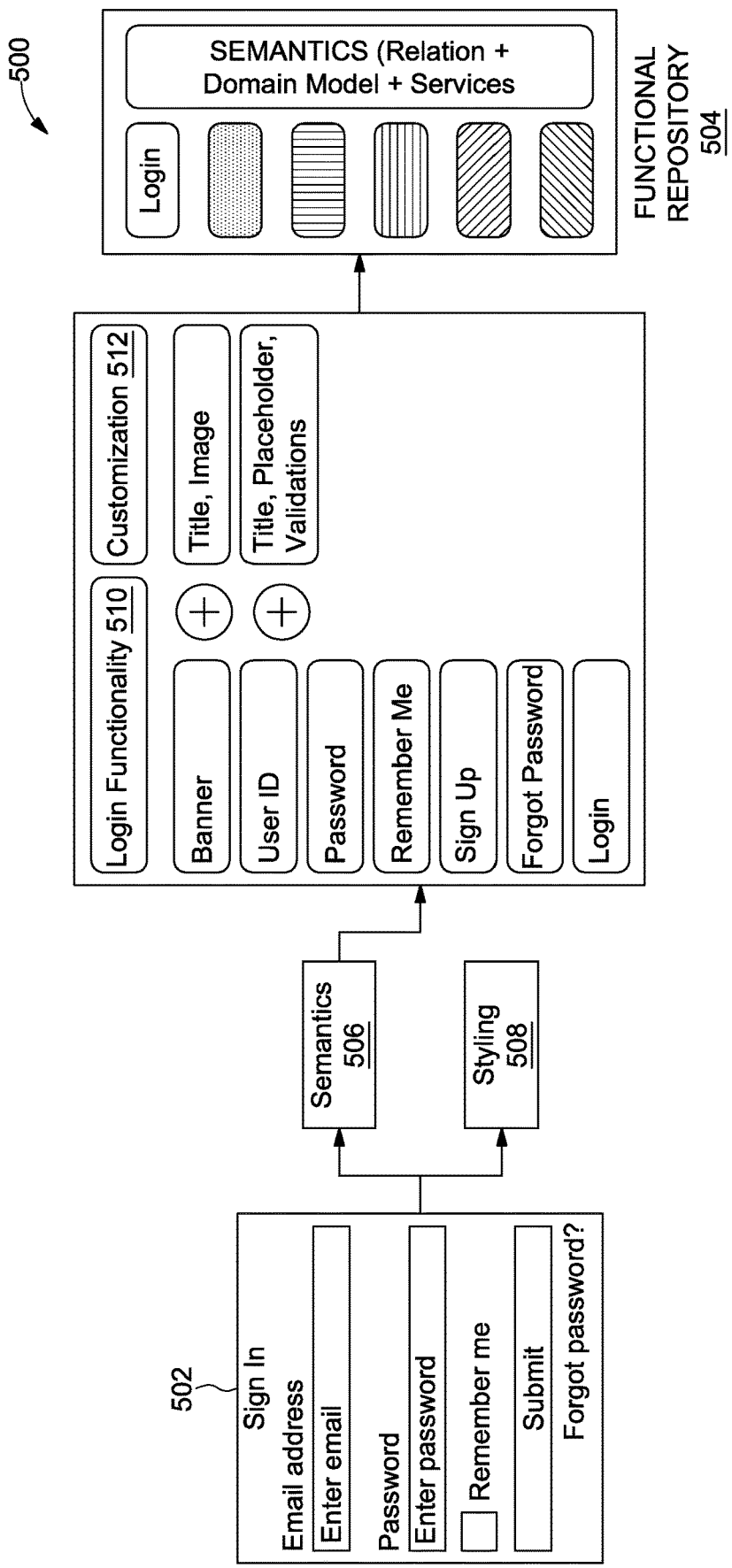
FIG. 5 is an exemplary block diagram illustrating semantics corresponding to a plurality of functional components of wireframe for creating an application UI, in accordance with an embodiment.

In some embodiments, semantics of the plurality of predefined sub-functions may be created and stored into the functional repository 404. The plurality of functional components of the wireframe 402 may be mapped to the semantics created and based on mapping the required application UI may be created. As shown in FIG. 5, in some embodiments, semantics 504 (for example, "Banner", "user ID", "Password", "Remember Me", "Sign UP", "Google®", "Facebook®", "Forget Password", and "Login") of a login functionality 510 corresponding to the plurality of functional components of the wireframe 402 may be created and stored in the functional repository 504. It may be noted that the plurality of functional components may be customizable. For example, a functional component "Sign In" of the wireframe 502 may be customized by using a customization tab 512 based on a customer requirement. The functional components which are not a part of the functional repository 504, may be identified as custom types and a user needs to provide more details for that functional component. This is further explained in detail in conjunction with FIG. 6.

With reference to FIG. 4, based on mapping, a code may be automatically generated for creating the required application UI. The generated code may have a look and feel which is as per the wireframe 402 and the functionality may be from the semantics defined in the functional repository 404. In some embodiments, the code may be generated using the various specific builders available for the technology (for example, angular may have its own builder and react may have a separate builder for generating the code). The created application UI may be functional working application which may then be used for further development if required.

As will be appreciated, like login requirement, the functional repository 404 may also store semantics related to other functionality. For example, if the requirement is related to a complete quote application or a complete self-registration application, then the corresponding semantics associated with quote functionality and registration functionality may be created and stored in the function repository 404. Along with generating the code, styling 508 (for example, branding styles) for customer may also be generated based on the identified locations of the plurality of functional components in the wireframe 402.

Figure 6:
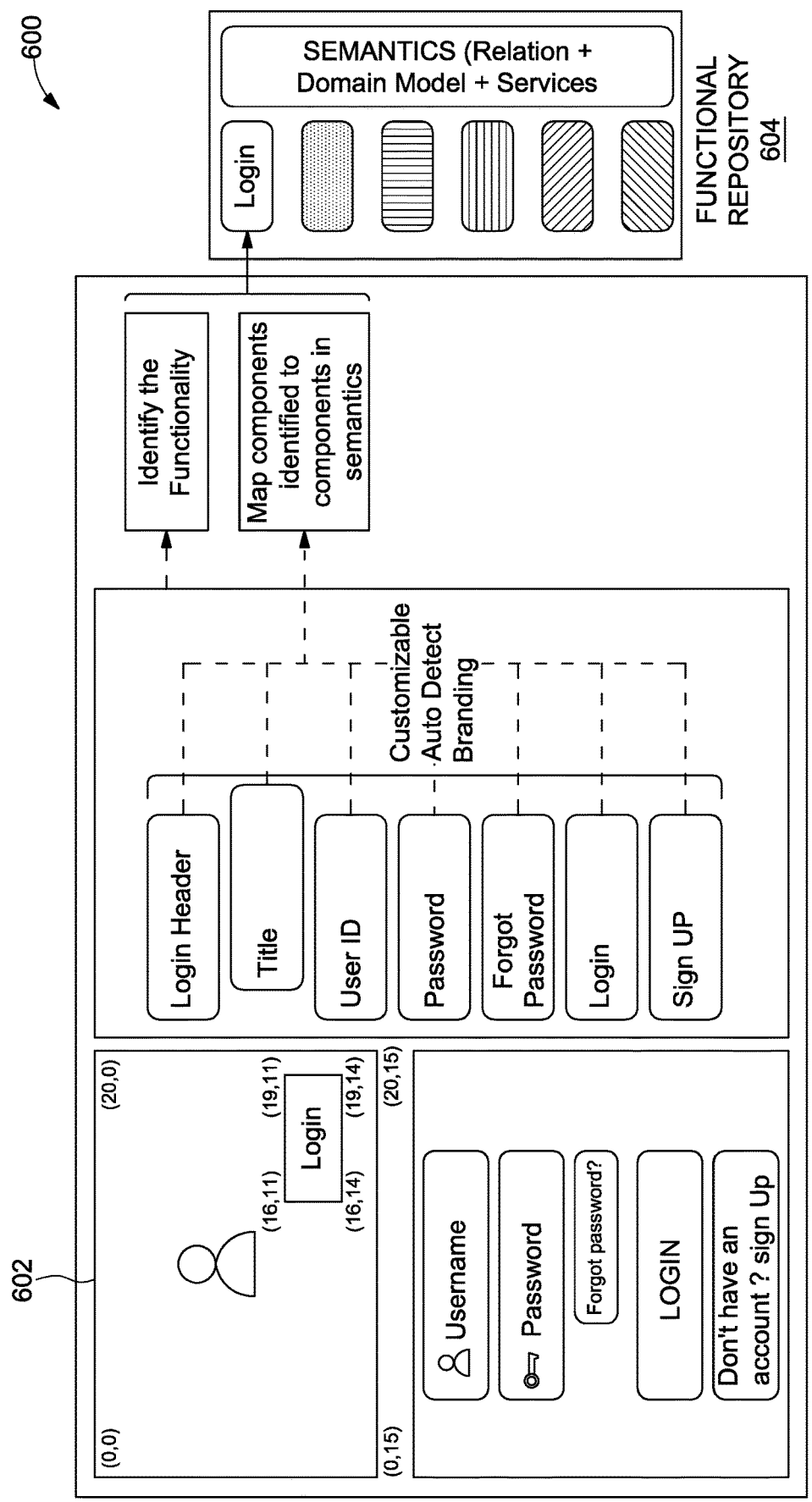
FIG. 6 is an exemplary block diagram for creating an application UI for a login functionality within an IDE, in accordance with an embodiment.

Referring now to FIG. 6, an exemplary block diagram 600 for creating an application UI for login functionality within an IDE is illustrated, in accordance with an exemplary embodiment. In one example, consider that a customer requirement is to create the application UI for a login page. In that case, a wireframe 602 of the login page may be received in the IDE. The wireframe 602 of the login page may include a plurality of functional components. The plurality of functional components may be "Login", "Username", "Password", "Forget Password", and "Sign Up". It may be noted that the plurality of functional components may be customizable.

Further, a login functionality corresponding to the wireframe 602 of the login page may be identified from a plurality of functionalities within the functional repository 604. Once the login functionality is identified, the plurality of functional components of the wireframe 602 may be traced to identify locations of each of the plurality of functional components in the wireframe 602.

By way of an example, as shown in FIG. 6, the tracing may be executed through a co-ordinate system which may mark the parts of the wireframe 602 and build a hierarchical structure. It may be noted that this initial hierarchical structure may not give information about the functionality. With the help of the login functionality (already identified from the functional repository 604) nodes may be marked in the hierarchical structure to the respective functional components. For example, the nodes for login header may be marked using a login header coordinates (0,0), (20, 0), (0, 15) and (20,15), and the nodes for login may be marked using login coordinates (16,11), (19,11), (16,14), and (19, 14) within the wireframe 602. The functional components that may not be the part of the functional repository 604, may be identified as custom types. For such functional components, the user needs to provide more details related to the requirements. The co-ordinate system may help to create a hierarchical representation of the functional component which helps to understand a parent-child relationship between the functional components. The co-ordinate system also helps to understand the spacing/margins between the identified functionality thereby ensuring the consistent spacing between the generated code and the wireframe 602.

Once the areas in the wireframe 602 are traced, the plurality of functional components may be mapped to the semantics associated with the plurality of predefined sub-functions in the functional repository 604. In some embodiments, based on mapping of the plurality of functional components, a code may be generated automatically. The generated code may be configured to create a desired application UI.

Figure 7A:
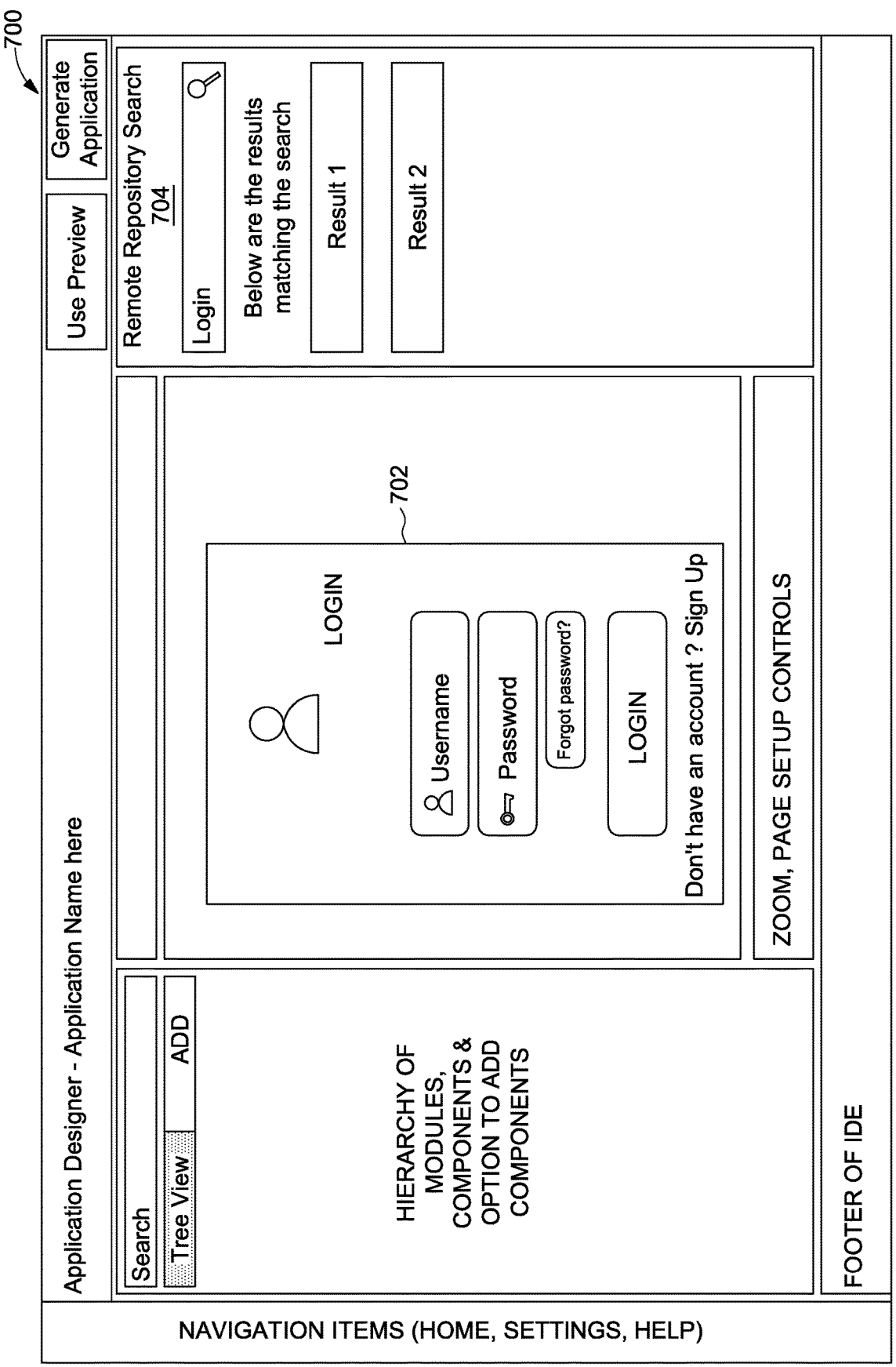
FIGS. 7A-7B illustrate an exemplary IDE for creating an application UI, in accordance with an exemplary embodiment.
Figure 7B:
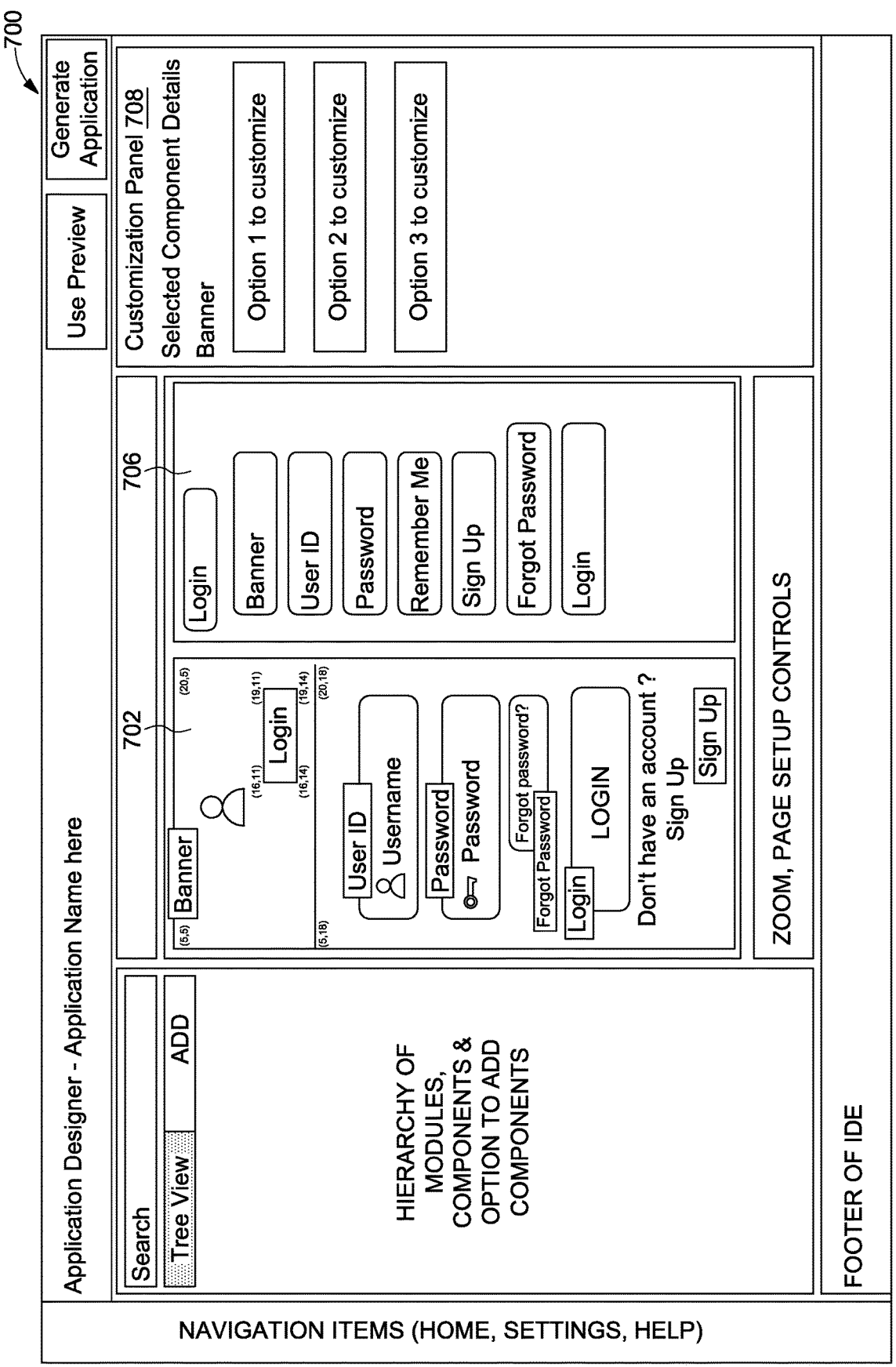

Referring now to FIGS. 7A-7B, an exemplary IDE 700 for creating an application UI is illustrated, in accordance with an exemplary embodiment. The IDE 700 may receive a wireframe 702 for a current application requirement i.e., for creating a login page. The wireframe 702 may include a plurality of functional components. Since the requirement is related to the login page, the plurality of functional components in the wireframe 702 may correspond to login components. For identifying a functionality corresponding to the wireframe 702, user may search a functional repository using a remote repository search tab 704.

Upon pressing the remote repository search tab 704, search results may be displayed. The search results may include identified login functionality corresponding to the login components of the wireframe 702. It may be noted that the login functionality in the functional repository may include semantics corresponding to the login components of the wireframe 702 that may be used to build the plurality of functional components within the login page. The semantics of the functionality includes the implementation of the functionality in the specific technology that may be used to generate the final application UI. It may include the domain model, the integration with backend services if applicable. It may also have a mapping with the UI elements that may be available in the reference implementation of the functionality.

With reference to FIG. 7B, once the login functionality corresponding to the login components of the wireframe 702 is identified, the user may trace a "banner" from the login components in the wireframe 702. Tracing may be performed by creating the co-ordinates of the plurality of functional components in the wireframe 702. The functional components may be customized and used from the remote functional repository based on requirement. The co-ordinates may help to position the plurality of functional components on the application UI. The IDE 700 may also facilitate the user to trace in a mobile/tablet mode, where the user may not be required to create a new component. The user simply maps the position of the component that is already selected in a desktop mode.

The semantics of the login functionality 706 corresponding to the login components from the remote knowledge repository may be displayed in the IDE 700. The user may select "banner" from a semantic list. Based on the selection, a corresponding "banner" may be identified in the wireframe 702. The user may further customize the "banner" using a customization panel 708. Based on a type of component and a requirement, corresponding options may be shown in the customization panel 708.

Figure 8:
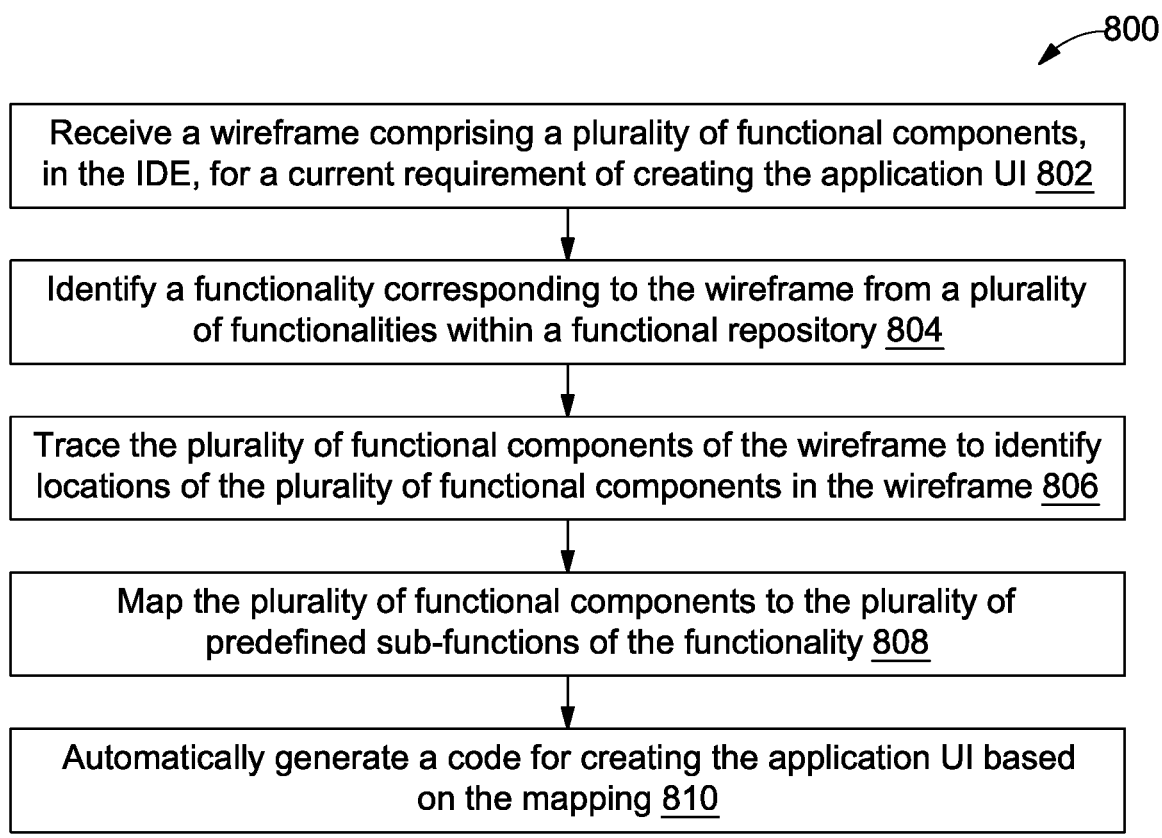
FIG. 8 illustrates a flowchart of a method for creating an application UI within an IDE, in accordance with an embodiment.

Referring now to FIG. 8, a flowchart of a method 800 for creating an application UI within an IDE is illustrated, in accordance with an embodiment. In some embodiments, the method 800 may be performed by various modules 204-212 of the processing device 202. FIG. 8 is explained in conjunction with FIGS. 1-8. At step 802, a wireframe may be received in the IDE, for a current requirement of creating the application UI. The wireframe may include a plurality of functional components. It may be noted that the plurality of functional components may be customizable.

In some embodiments, the requirement may be received to create the application UI. Based on the requirement, the wireframe may be extracted in the IDE. At step 804, a functionality corresponding to the wireframe may be identified from a plurality of functionalities within a functional repository. The functionality may include a plurality of sub-functions.

At step 806, the plurality of functional components of the wireframe may be traced through a co-ordinate system to identify locations of the plurality of functional components in the wireframe. In order to trace the plurality of functional components, initially the co-ordinates of each of the plurality of functional components may be created. Thereafter, the created co-ordinates may help to position the plurality of functional components on the wireframe. It may be noted that the functionality corresponding to the plurality of functional components of the wireframe may be customized and used from the functional repository.

At step 808, the plurality of functional components may be mapped to the plurality of sub-functions of the functionality. The plurality of sub-functions may include semantics that may corresponds to the plurality of functional components. In some embodiments, a hierarchal semantic tree of a plurality of semantics corresponding to the plurality of functional components may be created. Once the hierarchal semantic tree is created, it may then be stored into the functional repository. The process of creating the semantics is explained further in detail in conjunction with FIG. 9.

In some embodiments, the plurality of functional components of the wireframe may be mapped with the plurality of semantics that is stored in the functional repository. Based on the mapping, at step 810, a code may be automatically generated for creating the application UI. Specific builders may be available for each framework (for example, an Angular framework, a React framework, a Flutter framework, or an Xamarin framework) which may be used in generating the code to the respective framework. For each framework, a component library may be required to generate the code.

Figure 9:
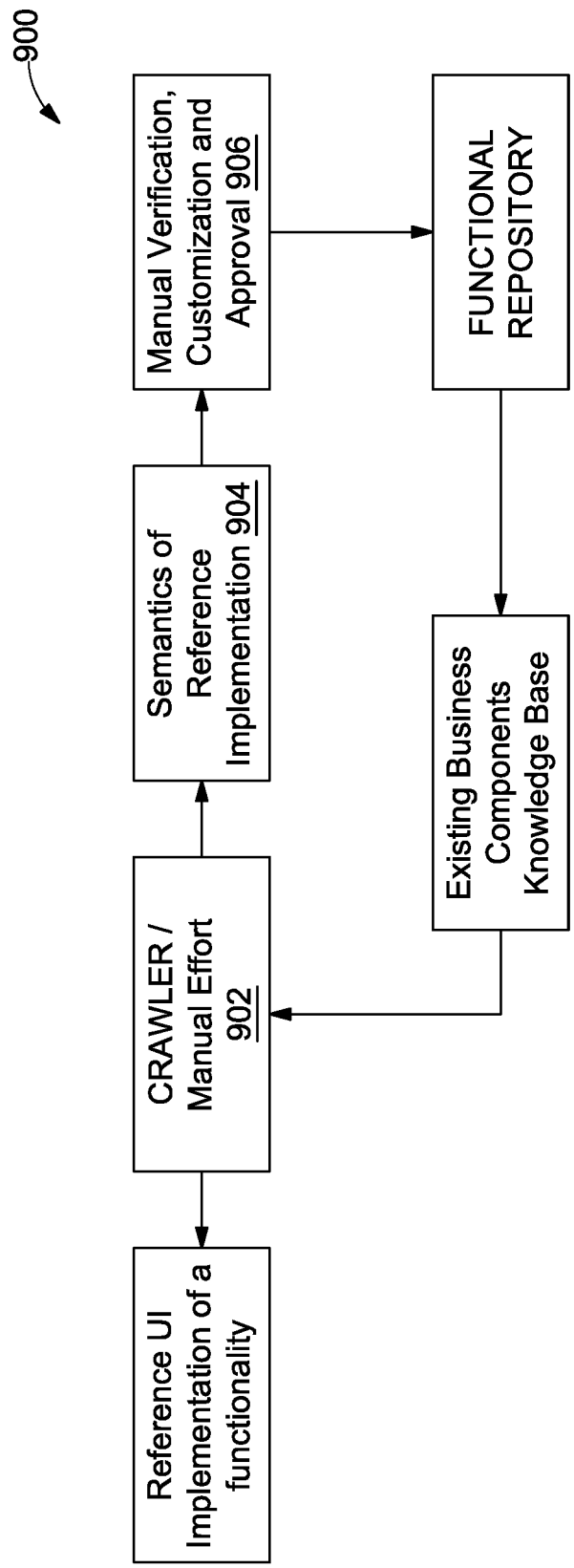
FIG. 9 illustrates a process of creating semantics corresponding to the plurality of functional components of the wireframe, in accordance with an embodiment.

Referring now to FIG. 9, a process of creating semantics corresponding to the plurality of functional components is illustrated via block diagram 900, in accordance with an embodiment. At block 902, a web crawler may be run to a reference implementation corresponding to the plurality of functional components. In an embodiment, the reference implementation may correspond to the login functionality. Using the web crawler, a semantic tree corresponding to the reference implementation may be created, at block 904. In some other embodiments, the semantic tree may be created using manual efforts. It may be noted that business components that may be prestored in the business components knowledge base may also help in creating the semantic tree.

The semantic tree may include a plurality of semantics corresponding to the reference implementation of the plurality of functional components. Further, the plurality of semantics may then be stored in the knowledge base. It may be noted that the knowledge base may be associated with the functional repository.

Once the plurality of semantics from the reference implementation is created, at block 906, a manual review process may be performed with the help of an interface which make sure that the identified information is correct. Further, modifications may be performed if required. The reference implementation may be reviewed manually and may give sign-off by an expert. In some embodiments, the plurality of semantics stored in the knowledge base may further be used to create new applications based on the different interfaces that the user receives upon mapping the plurality of functional components with the plurality of semantics.

As will be appreciated by those skilled in the art, the above techniques relate to creating an application UI within an IDE. The techniques allow a user to create the application UI by providing one or more application requirements within the IDE. Further, the techniques provide for accelerating the application development by reducing development time, which enables faster time to market with reduced cost of implementation. The extent to which development effort may be reduced depends on the knowledge in the functional repository and the alignment of requirements. As the functional repository becomes more matured, more than 60-70% effort on UI and backend may be saved. The techniques further provide for extracting the customer branding from the wireframe and/or prototype. This helps in case of future branding changes. The designed application code helps in reducing the future development and maintenance.

The specification has described method and system for creating an application UI within an IDE. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for creating an application User Interface (UI) within an Integrated Development Environment (IDE), the method comprising:
   receiving, by a processing device, a wireframe comprising a plurality of functional components, in the IDE, for a current requirement of creating the application UI;
   identifying, by the processing device, a functionality corresponding to the wireframe from a plurality of functionalities within a functional repository, wherein the functionality comprises a plurality of predefined sub-functions;
   tracing, by the processing device and through a co-ordinate system, the plurality of functional components of the wireframe to identify locations of the plurality of functional components in the wireframe;
   mapping, by the processing device, the plurality of functional components to the plurality of predefined sub-functions of the functionality; and
   creating a hierarchal semantic tree of a plurality of semantics corresponding to functional components of the wireframes and storing the plurality of semantics into the functional repository; and
   automatically generating, by the processing device, a code for creating the application UI based on the mapping;
   receiving the requirement to create the application UI; and
   extracting the wireframe based on the requirement in the IDE.

2. The method of claim 1, wherein the predefined sub-functions is customizable.

3. The method of claim 1, further comprising generating one or more branding styles based on the identified locations of the plurality of functional components in the wireframe.

4. The method of claim 1, wherein the plurality of pre-defined sub-functions comprises semantics corresponding to the plurality of functional components.

5. A system for creating an application User Interface (UI) within an Integrated Development Environment (IDE), the system comprising:
   a processor; and
   a memory communicatively coupled to the processor, wherein the memory stores processor instructions, which when executed by the processor, cause the processor to:
   receiving, by a processing device, a wireframe comprising a plurality of functional components, in the IDE, for a current requirement of creating the application UI
   identifying, by the processing device, a functionality corresponding to the wireframe from a plurality of functionalities within a functional repository, wherein the functionality comprises a plurality of predefined sub-functions;
   tracing, by the processing device and through a co-ordinate system, the plurality of functional components of the wireframe to identify locations of the plurality of functional components in the wireframe;
   mapping, by the processing device, the plurality of functional components to the plurality of predefined sub-functions of the functionality; and
   creating a hierarchal semantic tree of a plurality of semantics corresponding to functional components of the wireframes and storing the plurality of semantics into the functional repository; and automatically generating, by the processing device, a code for creating the application UI based on the mapping;
receive the requirement to create the application UI; and
extract the wireframe based on the requirement in the IDE.

6. The system of claim 5, wherein the predefined sub-functions is customizable.

7. The system of claim 5, wherein the processing device instructions further cause the processing device to generate one or more branding styles based on the identified locations of the plurality of functional components in the wireframe.

8. The system of claim 5, wherein the plurality of pre-defined sub-functions comprises semantics corresponding to the plurality of functional components.

9. A computer program product for creating an application User Interface (UI) within an Integrated Development Environment (IDE), the computer program product being embodied in a non-transitory computer readable storage medium of a processing device and comprising computer instructions for:

receiving a wireframe comprising a plurality of functional components, in the IDE, for a current requirement of creating the application UI;

identifying a functionality corresponding to the wireframe from a plurality of functionalities within a functional repository, wherein the functionality comprises a plurality of predefined sub-functions;

tracing the plurality of functional components of the wireframe to identify locations of the plurality of functional components in the wireframe;

mapping the plurality of functional components to the plurality of predefined sub-functions of the functionality; and creating a hierarchal semantic tree of a plurality of semantics corresponding to functional components of the wireframes and storing the plurality of semantics into the functional repository; and automatically generating a code for creating the application UI based on the mapping;

receiving the requirement to create the application UI; and extracting the wireframe based on the requirement in the IDE.

10. The computer program product of claim 9, wherein the predefined sub-functions is customizable.

11. The computer program product of claim 9, wherein the computer instructions further configured for generating one or more branding styles based on the identified locations of the plurality of functional components in the wireframe.

12. The computer program product of claim 9, wherein the plurality of pre-defined sub-functions comprises semantics corresponding to the plurality of functional components.

* * * * *